(12) United States Patent
Becker et al.

(10) Patent No.: US 10,525,669 B2
(45) Date of Patent: Jan. 7, 2020

(54) METHOD FOR PRODUCING A COMPOSITE MATERIAL, AND A PROVISIONAL COMPOSITE

(71) Applicants: THYSSENKRUPP STEEL EUROPE AG, Duisburg (DE); thyssenkrupp AG, Essen (DE)

(72) Inventors: Jens-Ulrik Becker, Duisburg (DE); Rainer Klenn, Duisburg (DE); Stefan Myslowicki, Mönchengladbach (DE); Roland Wunderlich, Bergkamen (DE)

(73) Assignees: THYSSENKRUPP STEEL EUROPE AG, Duisburg (DE); THYSSENKRUPP AG, Essen (DE)

( * ) Notice: Subject to any disclaimer, the term of this patent is extended or adjusted under 35 U.S.C. 154(b) by 101 days.

(21) Appl. No.: 15/554,827

(22) PCT Filed: Feb. 23, 2016

(86) PCT No.: PCT/EP2016/053736
§ 371 (c)(1),
(2) Date: Aug. 31, 2017

(87) PCT Pub. No.: WO2016/139083
PCT Pub. Date: Sep. 9, 2016

(65) Prior Publication Data
US 2018/0236750 A1    Aug. 23, 2018

(30) Foreign Application Priority Data

Mar. 2, 2015 (DE) .................. 10 2015 102 961

(51) Int. Cl.
*B23K 20/00* (2006.01)
*B32B 15/01* (2006.01)
(Continued)

(52) U.S. Cl.
CPC ............ *B32B 15/011* (2013.01); *B23K 20/04* (2013.01); *B23K 20/227* (2013.01); *B23K 20/24* (2013.01);
(Continued)

(58) Field of Classification Search
CPC ....... B32B 15/011; B32B 15/18; B23K 31/02; B23K 20/24; B23K 20/04; B23K 20/227;
(Continued)

(56) References Cited

U.S. PATENT DOCUMENTS 1,886,615 A * 11/1932 Johnson ................. B23K 20/04
228/118
1,956,818 A * 5/1934 Acre ...................... B23K 20/04
148/534

(Continued)

FOREIGN PATENT DOCUMENTS

DE         895558 C      11/1953
DE    102005006606 B     3/2006
(Continued)

OTHER PUBLICATIONS

English Translation of International Search Report issued in PCT/EP2016/053736, dated May 10, 2016 (dated May 20, 2016).
(Continued)

*Primary Examiner* — Kiley S Stoner
(74) *Attorney, Agent, or Firm* — The Webb Law Firm

(57) ABSTRACT

A method for producing a composite material, particularly a steel composite material, may involve providing a first workpiece and a second workpiece, producing a bonded connection between said first and said second workpiece in order to form a provisional composite, and rolling said provisional composite in order to form the composite material. During the rolling, the bonded connection may be at least partially released, in the form of a predetermined
(Continued)

breaking point. The rolling may be performed as hot rolling. Further, the method may involve substantially hermetically sealing the provisional composite by way of a sealant. The first and second work pieces, moreover, may be peripherally connected by way of the bonded connection along an edge area of a contact surface formed by the first and second work pieces.

13 Claims, 1 Drawing Sheet

(51) Int. Cl.
    *B23K 20/04*     (2006.01)
    *B23K 20/227*     (2006.01)
    *B23K 20/24*     (2006.01)
    *B23K 31/02*     (2006.01)
    *B32B 15/18*     (2006.01)
    *B21B 1/38*     (2006.01)
    *B23K 101/16*     (2006.01)
    *B23K 101/18*     (2006.01)
    *B23K 103/04*     (2006.01)

(52) U.S. Cl.
    CPC .............. *B23K 31/02* (2013.01); *B32B 15/18* (2013.01); *B21B 2001/383* (2013.01); *B23K 2101/16* (2018.08); *B23K 2101/18* (2018.08); *B23K 2103/04* (2018.08)

(58) Field of Classification Search
    CPC ............ B23K 2101/16; B23K 2103/04; B23K 2101/18; B23K 20/103; B23K 26/206; B23K 2201/16; B21B 2001/383; B21B 1/38; B21B 2015/0092
    USPC ............ 228/155, 117, 158, 235.2, 17, 234.1, 228/235.1
    See application file for complete search history.

(56) References Cited

U.S. PATENT DOCUMENTS

| | | | |
|---|---|---|---|
| 2,159,043 A | 5/1939 | Orr, Jr. | |
| 2,395,878 A * | 3/1946 | Keene | B23K 20/04 29/509 |
| 2,744,314 A * | 5/1956 | Kinney, Jr. | B23K 20/04 228/160 |
| 2,745,172 A * | 5/1956 | Townsend | B23K 20/04 228/118 |
| 2,757,444 A | 8/1956 | Chace | |
| 3,001,059 A | 9/1961 | Jones | |
| 3,150,436 A * | 9/1964 | Bomberger | B21B 1/38 29/17.6 |
| 3,150,445 A | 9/1964 | Butt | |
| 3,858,428 A * | 1/1975 | Thompson | B21H 7/16 228/158 |
| 4,319,121 A * | 3/1982 | Yoshida | B23K 15/00 219/121.14 |
| 5,037,024 A * | 8/1991 | Minato | B21B 15/0085 228/125 |
| 5,056,703 A * | 10/1991 | Sawada | B23K 9/025 228/158 |
| 5,145,102 A * | 9/1992 | Minato | B21B 15/0085 228/125 |
| 5,323,951 A * | 6/1994 | Takechi | B23K 13/015 219/617 |
| 6,462,299 B1 * | 10/2002 | Takeda | B23K 26/26 219/121.14 |
| 2003/0038120 A1 * | 2/2003 | Minamida | B23K 26/1435 219/121.64 |
| 2007/0262123 A1 * | 11/2007 | Stuth | B23K 9/00 228/176 |
| 2016/0288248 A1 * | 10/2016 | Itoh | C22C 21/00 |
| 2018/0078995 A1 * | 3/2018 | Sun | B08B 7/00 |

FOREIGN PATENT DOCUMENTS

| | | |
|---|---|---|
| EP | D004063 A | 9/1979 |
| JP | S56122681 A | 9/1981 |
| JP | S5886993 A | 5/1983 |
| JP | 60130482 A * | 7/1985 ............. B23K 20/04 |

OTHER PUBLICATIONS

English abstract of JPS5886993A.
English abstract of DE102005006606B.
English abstract of JPS56122681.
English abstract of EP0004063.

\* cited by examiner

METHOD FOR PRODUCING A COMPOSITE MATERIAL, AND A PROVISIONAL COMPOSITE

CROSS REFERENCE TO RELATED APPLICATIONS

This application is a U.S. National Stage Entry of International Patent Application Serial Number PCT/EP2016/053736, filed Feb. 23, 2016, which claims priority to German Patent Application No. DE 10 2015 102 961.8 filed Mar. 2, 2015, the entire contents of both of which are incorporated herein by reference.

FIELD

The present disclosure generally relates to composite materials, including methods for producing steel composite materials and other composite materials.

BACKGROUND

Procedures, in which two slabs made of different materials are combined to one composite material by a hot-rolling process in order to be able to deliberately adjust or realize properties of the composite material, are sufficiently known from the prior art. Typically, the composite partners with the same size are arranged one above the other and welded together peripherally in order to prevent the formation of cinder and to transport the joined composite partners as safely as possible to the hot-rolling device. Since the slabs generally have unevenness, air chambers can form during the welding process, which can also still be found as bubbles between the composite partners after the hot-rolling process.

In order to counteract this formation of bubbles, procedures are known from the prior art, for example from publication EP 0 004 063, in which the elaborate attempt is made to evacuate air from between the work piecework pieces, before the composite partners are rolled to produce a composite material.

DETAILED DESCRIPTION

Figure 1:
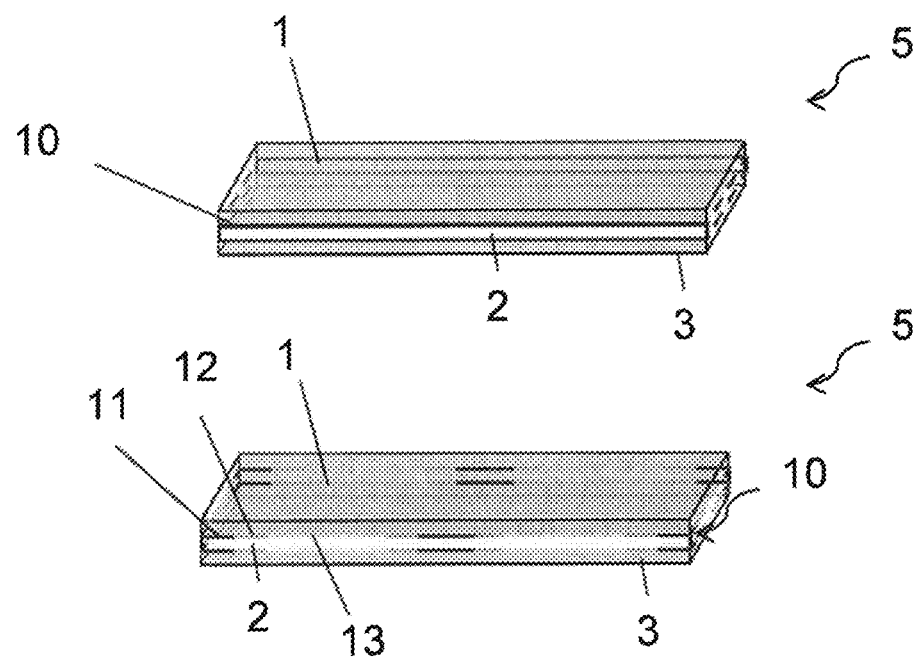
FIG. 1 is a perspective view of a provisional composite between a first and a second workpiece (top) and according to an exemplary embodiment (bottom) in a direct comparison.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

One example object of the present disclosure is to provide a procedure, with which the formation of bubbles in the production of a composite material, particularly a steel composite material, can be prevented as easily as possible.

One way in which the example object set forth above may be solved is by a procedure for producing a composite material, particularly a steel composite material, comprising the following procedure steps:

Providing a first work piecework piece and a second work piecework piece,

Producing a bonded connection, particularly a welded seam, between the first work piecework piece and the second work piecework piece in order to form a provisional composite, and Rolling, particularly hot rolling, the provisional composite in order to form the composite material, wherein the bonded connection, particularly the welded seam, is at least partially released, in the form of a predetermined breaking point, during the rolling process.

In comparison to the prior art, the procedure according to the invention has the advantage of the bonded connection, which is configured such that this connection is released again during the rolling process, particularly the hot-rolling process. As a result, air trapped in potential air chambers between the first work piece and the second work piece can be pressed out of these chambers again during the rolling process and leaves the area between the first work piece and the second work piece via the opened predetermined breaking point. In this way, the formation of bubbles can be prevented easily without depending on an elaborate additional procedure step, such as evacuating, for example.

Preferably, the rolling process, particularly the hot-rolling process, produces a sheet metal, particularly a metal strip. For this purpose, it is particularly intended that the first work piece and/or the second work piece are slabs, which are stacked one on top of the other to form a slab packet before producing the bonded connection. It is however also conceivable that the first work piece and/or the second work piece is a sheet bar. The bonded connection, for example a welded seam, is in this case produced preferably partially or completely peripherally along the outside of the joined packet of the first and second work piece, particularly in an area in which the first and the second work piece are next to each other.

Advantageous configurations and further developments of the invention can be taken from the dependent claims and the description with reference to the figures.

Another configuration of the present invention provides that the provisional composite is substantially hermetically sealed by means of a sealant. It is particularly intended that the sealant is inserted or applied in areas of the provisional composite without bonded connection. In this way, it can be avoided that air gets between the first work piece and the second work piece and thus facilitates the formation of cinder. In doing so, a heat-resistant sealant is preferably used, which withstands the temperatures prevailing during the production process, particularly the temperature in the furnace, into which the provisional composite is inserted for the hot-rolling process. This sealant is, for example, a lacquer, a black wash, and/or a paste, with which an area without bonded connection is filled and/or covered. A hot glue paste or a repair kit for a vehicle is also conceivable as sealant. The sealant is preferably a fire-resistant kit, a fire-resistant adhesive, or another fire-resistant mixture. The sealant particularly contains metal oxides, nitrides, silicates, and/or mineral materials, such as aluminum oxide, zirconium oxide, magnesium oxide, boron nitride, zirconium silicate, corundum, magnesite, and/or aluminum silicates.

Another configuration of the present invention provides that the first work piece and the second work piece are arranged in relation to one another to form a contact surface and are preferably peripherally connected, particularly welded, by means of a bonded connection along an edge area of the contact surface.

Another configuration provides that a load capacity of the bonded connection, particularly along the periphery of the provisional composite, is spatially modulated in order to realize the predetermined breaking point. In this respect, "load capacity" preferably refers to the tensile strength of the bonded connection with respect to shear, tensile, and/or compressive forces or the load capacity is generally determined by a damage threshold of the bonded connection. The load capacity of the bonded connection is, for example, also realized by an interruption of the bonded connection the otherwise peripheral connection, or a completely peripheral bonded connection is deliberately weakened in certain areas or further reinforced by additional bonded connections. It is particularly intended that an area with a first load capacity, particularly with a first damage threshold, and an area with a second load capacity, particularly with a second damage threshold, are realized when producing the bonded connection, wherein the first load capacity is less than the second load capacity or the second damage threshold is greater than the first damage threshold. The area with the first load capacity then preferably forms the area of the predetermined breaking point.

Another configuration of the present invention provides that a connecting material, for example a welding material, is used to produce the bonded connection. In doing so, the connecting material preferably comes into contact with both the first work piece and the second work piece. Particularly intended is a recess, in which the connecting material for forming the bonded connection is embedded and preferably arranged such that the connecting material is flush with the recess. The connecting material is, for example, realized by a welding bead.

Another configuration of the present invention provides that the connecting material is applied at least partially in multiple layers in order to produce a bonded connection. By a multi-layer arrangement, the bonded connection can be increased with respect to the load capacity in comparison to a single layer of the connecting material.

Another configuration of the present invention provides that the load capacity is modulated by means of the number of layers of connecting material along the bonded connections. It is particularly intended that one or no layer of the connecting material is arranged in an area with the first load capacity and at least one more layer of the connecting material than in the area with the first load capacity is arranged in an area with the second load capacity. In doing so, it is conceivable that a first layer, a second layer, and/or a third payer are arranged completely or partially peripherally along the provisional composite.

Another configuration of the present invention provides that the first work piece and the second work piece are at least partially cleaned before producing the bonded connection. Particularly, the first work piece and the second work piece are respectively cleaned, particularly blasted, on those lateral sides that are next to each other in the provisional composite. By means of the cleaning, it can be advantageously avoided that contaminations are trapped in the composite material after the rolling process.

Another object of the present invention is a provisional composite of a first work piece, particularly a slab and/or a sheet bar, and a second work piece, particularly a slab and/or a sheet bar, for producing a composite material, wherein the provisional composite has a bonded connection, preferably a welded seam, serving as predetermined breaking point.

In comparison to the prior art, the use of such a provisional composite according to the invention has the advantage that air can escape from the opened predetermined breaking point during the rolling process, which air would otherwise result in a formation of bubbles in the composite material.

Preferably, the first work piece and the second work piece form a slab packet and the provisional composite is provided in semi-manufactured form for the production of a sheet metal, particularly a metal strip. Moreover, the bonded connection extends completely or partially along the periphery of the provisional composite, particularly in the area of an interface between the first work piece and the second work piece. It is furthermore provided that the bonded connection is spatially modulated and/or the load capacity of the bonded connection is spatially modulated.

Another configuration of the present invention provides that the provisional composite comprises a sealant for hermetically sealing. In this respect, the sealant is preferably arranged in areas without bonded connection, particularly without a welded joint. In this way, it is advantageously avoided that the formation of cinder is caused by air that enters through the area without bonded connection.

Additional details, features, and advantages of the invention arise from the drawings as well as from the following description of preferred configurations with reference to the drawings. In this respect, the drawings illustrate only exemplary configurations of the invention, which do not limit the inventive concept.

FIG. 1 shows a direct comparison of a provisional composite of a first workpiece 1 and a second workpiece 2 according to the prior art and according to an exemplary embodiment of the present invention. Such a provisional composite 5 is preferably processed further by a rolling process, particularly a hot-rolling process, to form a composite material, particularly a steel composite material, wherein by the use of different materials for the first work piece 1 and the second work piece 2, the material properties for the composite material are deliberately adjusted. To form the provisional composite 5, a first work piece 1, for example in the form of a slab or a sheet bar, and a second work piece 2, for example in the form of another slab or another sheet bar, are placed next to each other along a common contact surface. The first work piece 1 and the second work piece 2 are preferably substantially congruently placed one above the other, for example to form a multi-layer slab packet. To this end, the first work piece 1 and the second work piece 2 are preferably designed or dimensioned equally in shape and size at least along one lateral surface. It is furthermore provided that the first work piece 1 and the second work piece 2 are cleaned, particularly blasted, before they are placed next to each other, at least along the lateral surfaces, via which the first work piece 1 and the second work piece 2 make contact with each other in the provisional composite 5. It is of decisive importance for the quality of the produced composite material that no air, which facilitates or causes a formation of cinder, comes in between the first work piece 1 and the second work piece 2. For this reason, the prior art provides that the first work piece 1 and the second work piece 2 are welded together peripherally so that no air can enter an intermediate space between the first work piece 1 and the second work piece 2. Such a welded joint additionally ensures that the first work piece 1 and the second work piece 2 are held together when they are transported to the hot-rolling process, i.e. to a device provided for the hot-rolling process. In the configuration shown, a first work piece 1, a second work piece 2, and a third work piece 3 are connected with one another in a slab packet, wherein a bonded connection between the first and the second work piece 1 and 2 as well as between the second work piece 2 and the third work piece 3 is respectively provided. However, the complete welded joint within the meaning of the prior art has the disadvantage that potentially trapped air can result in a formation of bubbles in the composite material. In order to prevent this formation of bubbles, the exemplary configuration of the invention provides that a bonded connection 10 is produced, which is designed such that the bonded connection 10 within the meaning of a predetermined breaking point is at least partially released during the rolling process, particularly the hot-rolling process. By releasing the bonded connection 10, trapped air can be pressed out of the opened predetermined breaking point again during the rolling process and a substantially bubble-free and thus high-quality composite material can be realized. For this purpose, it is particularly intended that the bonded connection is configured such that a load capacity, particularly a tensile strength, of the bonded connection 10 is modulated along the bonded connection 10. This means the bonded connection 10 comprises an area with a first load capacity 11 and an area with a second load capacity 12, wherein the first load capacity 11 is different from the second load capacity 12. For example, the area with the first load capacity 11 yields at lower shear or tensile forces compared to the area with the second load capacity 12 and forms the predetermined breaking point as a result. In the exemplary configuration shown, the bonded connection 10 additionally comprises an area with a third load capacity 13. In order to adjust the load capacity, the bonded connection 10 is, for example, modulated in multiple layers or in its thickness. It is furthermore conceivable that the provisional composite 5 comprises areas without bonded connection 10 and that these areas are sealed using a sealant, particularly a heat-resistant sealant, in order to hermetically seal the provisional composite 5. A paste, a black wash, and/or a lacquer are, for example, arranged in the area without bonded connection 10.

Figure 2:
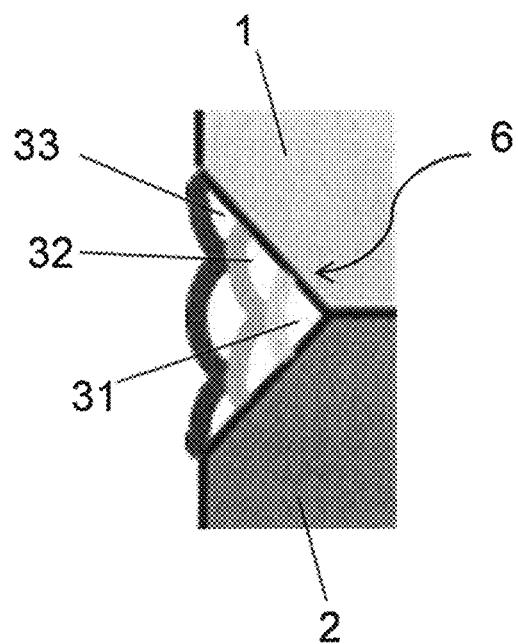
FIG. 2 is a detail view of an exemplary bonded connection for a provisional composite according to an exemplary embodiment.

FIG. 2 shows an exemplary bonded connection 10 for a provisional composite 5 according to the exemplary embodiment of the present invention. In this case, it is preferably provided that the bonded connection 10 is realized between the first work piece 1 and the second work piece 2 as a welded joint, for example by forming welding beads. It is furthermore conceivable that in a joined state, the first work piece 1 and the second work piece 2 provide a receptacle 6 for a connecting material, for example by notches or edge contours in the first work piece 1 and in the second work piece 2 forming in the joined state the receptacle 6. It is preferably provided that the bonded connection 10 is designed in multiple layers, for example in the form of several welding beads lying one above the other, i.e. a connecting material, for example a welding material, is applied in several layers. In order to modulate the load capacity along the bonded connection, particularly the welded joint, preferably the number of the bonded connections lying one above the other or the number of layers of the connecting materials is varied, preferably periodically modulated. In a first example for the bonded connection, a first layer 31 and a second layer 32 of the connecting material are arranged completely peripherally along the contact surface between the first work piece 1 and the second work piece 2 and partially covered by a third layer 33 of the connecting material. In a second example, the first layer 31 of the connecting material is arranged completely peripherally along the contact surface between the first work piece 1 and the second work piece 2 and partially covered by the second layer 32 and/or the third layer 33 of the connecting material. In a third example, the first layer 31, the second layer 32, and/or the third layer 33 of the connecting material are respectively arranged partially along the contact surface between the first and the second work piece. Any areas without connection 10 along the periphery extending along the edge of the contact surface are preferably sealed using the heat-resistant sealant.

LIST OF REFERENCE SYMBOLS

1 First work piece
2 Second work piece
3 Third work piece
5 Provisional composite
6 Receptacle
10 Bonded connection
11 First load capacity
12 Second load capacity
13 Third load capacity
31 First layer
32 Second layer
33 Third layer

What is claimed is:

1. A procedure for producing a composite material, the procedure comprising:
   providing a first work piece and a second work piece;
   producing a bonded connection between the first and second work pieces to form a provisional composite, wherein a load capacity of the bonded connection is spatially modulated to realize a predetermined breaking point within the bonded connection; and
   rolling the provisional composite to form the composite material, wherein during the rolling, the bonded connection is at least partially broken at the predetermined breaking point.

2. The procedure of claim 1 wherein the rolling is hot rolling.

3. The procedure of claim 1 further comprising substantially hermetically sealing the provisional composite by way of a sealant.

4. The procedure of claim 1 further comprising arranging the first and second work pieces relative to one another to form a contact surface.

5. The procedure of claim 4 further comprising peripherally connecting the first and second work pieces by way of the bonded connection along an edge area of the contact surface.

6. The procedure of claim 5 wherein the first and second work pieces are peripherally connected by welding.

7. The procedure of claim 1 comprising using a connecting material to produce the bonded connection.

8. The procedure of claim 7 comprising applying the connecting material for producing the bonded connection at least partially in multiple layers.

9. The procedure of claim 8 wherein the load capacity of the bonded connection is modulated by way of a number of layers of the connecting material along the bonded connection.

10. The procedure of claim 1 further comprising at least partially cleaning at least one of the first work piece or the second work piece before producing the bonded connection.

11. The procedure of claim 1 wherein the first work piece and the second workpiece comprise a metal.

12. The procedure of claim 1 wherein the first work piece and the second workpiece each comprise a steel slab or a steel sheet bar.

13. A procedure for producing a composite material, the procedure comprising:
   providing a first work piece and a second work piece;
   producing a bonded connection between the first and second work pieces to form a provisional composite, wherein connecting material is used to produce the bonded connection, the connecting material for producing the bonded connection is at least partially applied in multiple layers, and a load capacity of the bonded connection is modulated by way of a number of layers of the connecting material along the bonded connection to realize a predetermined breaking point within the bonded connection; and
   rolling the provisional composite to form the composite material, wherein during the rolling, the bonded connection is at least partially broken at the predetermined breaking point.

* * * * *